United States Patent [19]
Attix

[11] Patent Number: 5,438,598
[45] Date of Patent: Aug. 1, 1995

[54] COMBINED LOWER END FITTING AND DEBRIS FILTER

[75] Inventor: Douglas J. Attix, Lynchburg, Va.

[73] Assignee: B&W Fuel Company, Lynchburg, Va.

[21] Appl. No.: 213,756

[22] Filed: Mar. 15, 1994

[51] Int. Cl.6 .............................. G21C 1/04
[52] U.S. Cl. .................... 376/352; 376/313; 376/310
[58] Field of Search .............. 376/313, 310, 352; 976/DIG. 264

[56] References Cited

U.S. PATENT DOCUMENTS

| | | | |
|---|---|---|---|
| 4,684,495 | 8/1987 | Wilson et al. | 376/352 |
| 4,832,905 | 5/1989 | Bryan et al. | 376/352 |
| 4,900,507 | 2/1990 | Shallenberger et al. | 376/352 |
| 5,009,839 | 4/1991 | King | 376/352 |
| 5,037,605 | 8/1991 | Riordan, III | 376/352 |
| 5,071,617 | 12/1991 | Bryan et al. | 376/352 |
| 5,094,802 | 3/1992 | Riordan, III | 376/352 |

Primary Examiner—Donald P. Walsh
Assistant Examiner—Meena Chelliah
Attorney, Agent, or Firm—Robert J. Edwards; D. Neil LaHaye

[57] ABSTRACT

A combined lower end fitting and debris filter for a nuclear fuel assembly is provided that does not require multiple parts, welding, brazing, mechanical fasteners, drilling or EDM operations to form the coolant flow holes. The lower end fitting and debris filter are cast as a single work piece that includes the coolant flow holes in the casting process. This is accomplished by casting the sections of the filtration surface having flow holes in a thickness that allows for the small coolant flow holes to be formed as part of the casting process.

1 Claim, 1 Drawing Sheet

COMBINED LOWER END FITTING AND DEBRIS FILTER

BACKGROUND OF THE INVENTION

1. Field of the Invention

The present invention is generally related to nuclear fuel assemblies and in particular to lower end fittings and debris filters used in conjunction with nuclear fuel assemblies.

2. General Background

Commercial nuclear reactors include multiple fuel assemblies. Each fuel assembly is comprised of a number of fuel rods radially spaced apart in a parallel array by grid assemblies spaced along the length of the fuel rods. Each grid assembly is formed in an egg crate design by multiple metal strips that criss-cross at right angles to form individual cells for each of the fuel rods. The strips are provided with tabs that project into the cells against the fuel rods. The tabs serve the purposes of holding the fuel rods in their respective radial positions and providing maximum surface area contact of the fuel rods with coolant flowing through the cells. Control rod guide tubes, also referred to as thimble tubes, also extend through selected cells in the grid assembly and are attached at their upper and lower ends respectively to an upper end fitting and a lower end fitting. The upper and lower end fittings are also commonly referred to in the industry as nozzle plates since they are rigid plates that provide structural integrity and load bearing support to the fuel assembly and are provided with flow apertures therethrough for coolant flow. The lower end fitting or nozzle plate is positioned directly above openings in the lower portion of the reactor where coolant flows up into the reactor to the core. The ligaments between apertures in the end fittings coincide with the ends of the fuel rods and limit upward or downward movement of the fuel rods. Debris such as metal particles, chips, and turnings is generated during manufacture, installation, and repair of the reactor, piping, and associated cooling equipment. The size and complexities of the equipment prevent location and removal of all such debris before operations are commenced. Also, some of this debris may not become loose matter in the system until the system is put into operation. It has been recognized that this debris presents a greater problem to the system than previously thought. These small pieces of debris have been found to lodge between the walls of the grid cells and the fuel rods. Movement and vibration of the lodged debris caused by coolant flow results in abrasion and removal of cladding on the fuel rods. This in turn leads to detrimental effects such as corrosion of the fuel rods and failure to retain radioactive fission gas products. Such damage, although not critical to safety of the surrounding environment, can reduce operating efficiency by the need to suspend operation while replacing damaged fuel rods. It can be seen that a need exists for a debris filter capable of filtering debris of a size which may lodge between the grid cell walls and the fuel rods. An important consideration besides that of filtration is that a substantial coolant pressure drop across the filter must be avoided in order to maintain an adequate coolant flow over the fuel rods for heat removal therefrom. Also, increased pressure drop means a greater flow pressure against the fuel assembly and thus requires more fuel assembly holddown force(stronger springs on the upper end fitting). Patented approaches to this problem of which applicant is aware include the following.

U.S. Pat. Nos. 4,684,495 and 4,684,496 disclose debris traps formed from a plurality of straps aligned with one another in a crisscross arrangement and defining a plurality of interconnected wall portions which form a multiplicity of small cells each having open opposite ends and a central channel for coolant flow through the trap.

U.S. Pat. No. 4,828,791 discloses a debris resistant bottom nozzle which is a substantially solid plate having cut-out regions in alignment with inlet flow holes in the lower core plate. Separate criss-cross structures fixed to the plate extend across the cut-out regions to act as a debris trap.

U.S. Pat. Nos. 4,664,880 and 4,678,627 disclose debris traps mounted within a bottom nozzle that define a hollow enclosure with an opening so as to form a debris capturing and retaining chamber.

U.S. Pat. Nos. 4,652,425 discloses a trap for catching debris disposed between the bottom nozzle and the bottom grid. The structure forms multiple hollow cells that receive the fuel rod lower end plugs with dimples in each cell for catching debris carried into the cells by the coolant flow.

U.S. Pat. Nos. 5,009,839; 5,037,605; and 5,094,802 disclose debris filters that use two or more separate parts to form the debris filter or a plate that has the coolant flow holes formed by drilling or electrical discharge machining.

U.S. Pat. Nos. 4,900,507 discloses a debris filter wherein a separate filter plate is attached to a support structure.

Known debris filters used in conjunction with lower end fittings are either formed from multiple parts that require welding or brazing or single plates that require expensive drilling and/or EDM operations to form the coolant flow holes since small openings can not be cast through thick sections. Both types of debris filters add cost and complexity to manufacturing.

SUMMARY OF THE INVENTION

The present invention addresses the above problem in a straightforward manner. What is provided is a single piece lower end fitting and debris filter that does not require multiple parts, welding, brazing, mechanical fasteners, drilling or EDM operations to form the coolant flow holes. The lower end fitting and debris filter are cast as a single work piece that includes the coolant flow holes in the casting process. This is accomplished by casting the filtration surface thin to allow the small coolant flow holes to be formed as part of the casting process.

BRIEF DESCRIPTION OF THE DRAWINGS

For a further understanding of the nature and objects of the present invention reference should be had to the following description, taken in conjunction with the accompanying drawings in which like parts are given like reference numerals, and wherein.

DETAILED DESCRIPTION OF THE PREFERRED EMBODIMENT

Figure 1:
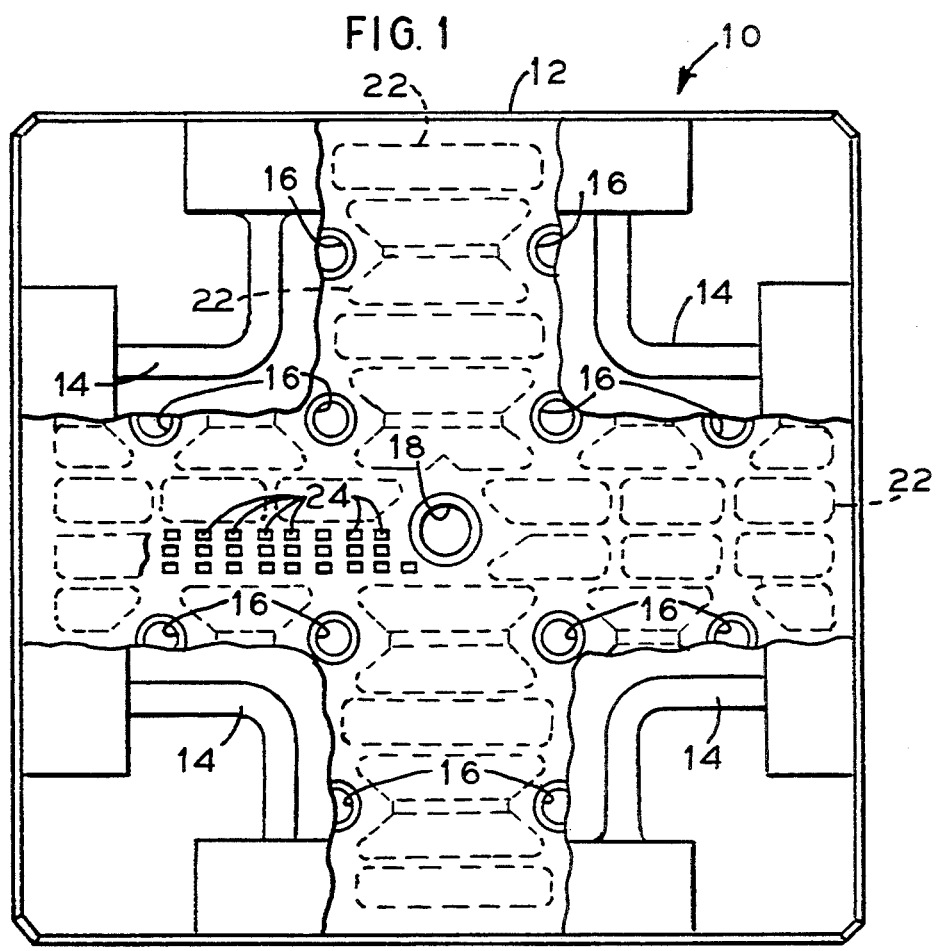
FIG. 1 is a partial cut away top view of the invention.

Referring to the drawings, it is seen in FIG. 1 that the invention is generally indicated by the numeral 10. Combined lower end fitting and debris filter 10 is a lower end fitting 12 for a nuclear fuel assembly that is formed from a single cast piece. Lower end fitting 12 is provided with an anti-straddle bar 14 at each corner that serve to indicate whether the fuel assembly is properly installed in the reactor. Lower end fitting 12 also contains a plurality of bores 16 therethrough for guide tubes and a central bore 18 therethrough for an instrument tube.

Figure 2:
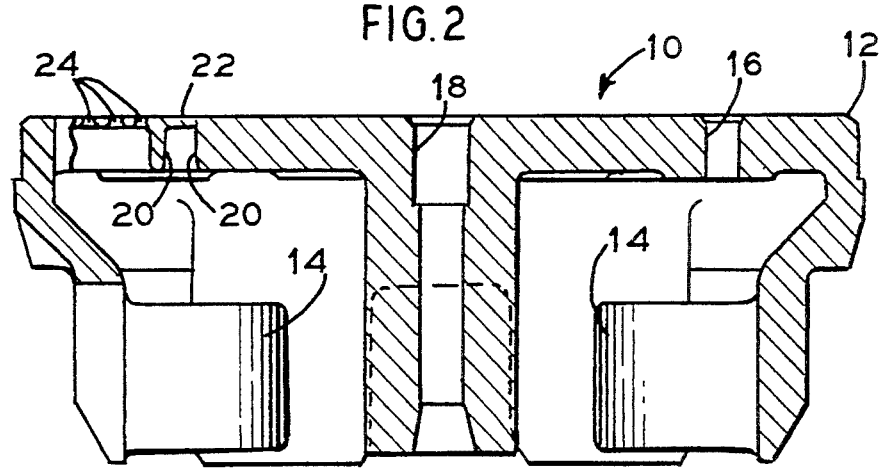
FIG. 2 is a side sectional view of the invention.

Lower end fitting 12 is a single cast piece having a plurality of interconnected ribs 20 (best seen in FIG. 2) at least five-eighth inch thick and a plurality of membranes 22 between ribs 20 that have a thickness of approximately 0.080 inch. The ribs provide the necessary structural integrity during a loss of coolant accident. Coolant flow holes 24 are cast in membranes 22 during the casting of lower end fitting 12. Coolant flow holes 24 are sized to act as a filter in the coolant stream to prevent potentially damaging debris from flowing past lower end fitting 12 to the fuel rods. For ease of illustration, and because the size and arrangement of flow holes 24 will be dependent upon the fuel assembly in which lower end fitting 12 and debris filter 10 is used, only a sampling of flow holes 24 are shown in FIG. 1. It should be understood that membranes 22 and flow holes 24 are spaced across the entire surface of lower end fitting 12 and that the partial cut away view is for the purpose of illustrating the single piece nature of lower end fitting 12 and debris filter 10. As seen in the side sectional view of FIG. 2, flow holes 24 are preferably larger at their lower end and are tapered inwardly in the direction of coolant flow through flow holes 24. This reduces pressure drop of coolant flow across flow holes 24 while maintaining acceptable filtration characteristics. The cast one-piece lower end fitting and debris filter provides for a simpler and less expensive structure than the multi-piece debris filters and end fittings currently in use.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A combined lower end fitting and debris filter for a nuclear fuel assembly, comprising a single piece cast lower end fitting wherein the upper horizontal portion that faces the fuel assembly has a plurality of interconnected ribs with a thickness of approximately 0.625 inch and a plurality of sections between said ribs with a thickness of approximately 0.080 inch that include a plurality of debris filtering coolant flow holes therethrough formed during the casting of said lower end fitting, where the coolant flow holes are tapered inwardly in the direction of coolant flow through the flow holes.

* * * * *